(12) United States Patent
Weder et al.

(10) Patent No.: US 9,552,499 B2
(45) Date of Patent: Jan. 24, 2017

(54) CIRCUIT ARRANGEMENT AND METHOD FOR SAFEGUARDING A CIRCUIT ARRANGEMENT WITH RESPECT TO REPEATED LIGHT ATTACKS

(71) Applicant: Infineon Technologies AG, Neubiberg (DE)

(72) Inventors: Uwe Weder, Au/Hallertau (DE); Thomas Kuenemund, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 85 days.

(21) Appl. No.: 14/541,258

(22) Filed: Nov. 14, 2014

(65) Prior Publication Data

US 2015/0135340 A1    May 14, 2015

(30) Foreign Application Priority Data

Nov. 14, 2013  (DE) .................. 10 2013 112 552

(51) Int. Cl.
*G06F 21/75* (2013.01)
*G06F 21/76* (2013.01)
*G06F 21/55* (2013.01)
*H01L 23/552* (2006.01)
*H01L 23/00* (2006.01)

(52) U.S. Cl.
CPC ............ *G06F 21/75* (2013.01); *G06F 21/556* (2013.01); *G06F 21/558* (2013.01); *G06F 21/76* (2013.01); *H01L 23/552* (2013.01); *H01L 23/576* (2013.01)

(58) Field of Classification Search
CPC .......... G06F 21/70; G06F 21/75; G06F 21/76; G06F 21/86; H01L 23/576; H01L 23/57; H01L 23/552
See application file for complete search history.

(56) References Cited

U.S. PATENT DOCUMENTS

| 6,657,314 | B2 | 12/2003 | Pockrandt |
| 6,798,234 | B2 | 9/2004 | Laackmann et al. |
| 7,015,821 | B2 * | 3/2006 | Gamperl ............... G11C 16/22 340/635 |
| 7,038,307 | B2 | 5/2006 | Ungar et al. |
| 7,180,071 | B2 | 2/2007 | Laackmann |
| 7,473,958 | B2 * | 1/2009 | Wagner ............ G06K 19/07372 257/314 |
| 7,813,175 | B2 * | 10/2010 | Kim .................... G06K 19/0723 365/185.05 |

(Continued)

FOREIGN PATENT DOCUMENTS

DE        103 45 240 A1   5/2005
DE   10 2007 058 003 A1   6/2009
(Continued)

*Primary Examiner* — Zachary A Davis
(74) *Attorney, Agent, or Firm* — Viering, Jentschura & Partner mbB

(57) ABSTRACT

In various embodiments, a circuit arrangement is provided. The circuit arrangement may include a detection circuit, which is designed to detect light attacks on the circuit arrangement; a processing circuit, which is designed to initiate a current flow through a line for each light attack detected by the detection circuit; and a control circuit, which is designed to enable functioning of a component of the circuit arrangement depending on the conducting state of the line.

15 Claims, 4 Drawing Sheets

(56) References Cited

U.S. PATENT DOCUMENTS

| | | | |
|---|---|---|---|
| 7,821,841 B2 * | 10/2010 | Kim | G11C 5/005 |
| | | | 365/185.32 |
| 8,890,205 B2 | 11/2014 | Kuenemund et al. | |
| 8,907,452 B2 * | 12/2014 | Marinet | H01L 29/7322 |
| | | | 257/511 |
| 9,052,345 B2 * | 6/2015 | Lisart | H01L 23/576 |
| 2002/0060359 A1 | 5/2002 | Pockrandt | |
| 2003/0132777 A1 | 7/2003 | Laackmann et al. | |
| 2005/0067587 A1 | 3/2005 | Laackmann | |
| 2005/0236683 A1 | 10/2005 | Shapiro et al. | |
| 2006/0192681 A1 | 8/2006 | Haider et al. | |
| 2011/0002184 A1 * | 1/2011 | Kim | G11C 5/005 |
| | | | 365/207 |
| 2011/0139879 A1 * | 6/2011 | Morin | G06K 19/073 |
| | | | 235/492 |
| 2013/0100559 A1 | 4/2013 | Kuenemund et al. | |
| 2013/0278284 A1 * | 10/2013 | Watanabe | H01L 23/576 |
| | | | 326/8 |

FOREIGN PATENT DOCUMENTS

| | | |
|---|---|---|
| DE | 10 2010 045 328 A1 | 3/2012 |
| DE | 10 2011 018 450 A1 | 10/2012 |
| WO | 00/58807 A1 | 10/2000 |
| WO | 02/17398 A1 | 2/2002 |

* cited by examiner

CIRCUIT ARRANGEMENT AND METHOD FOR SAFEGUARDING A CIRCUIT ARRANGEMENT WITH RESPECT TO REPEATED LIGHT ATTACKS

CROSS-REFERENCE TO RELATED APPLICATION

This application claims priority to German Patent Application Serial No. 10 2013 112 552.2, which was filed Nov. 14, 2013, and is incorporated herein by reference in its entirety.

TECHNICAL FIELD

Various embodiments relate generally to circuit arrangements and methods for safeguarding a circuit arrangement with respect to repeated light attacks.

BACKGROUND

Integrated circuits which are used for safety-critical applications, for example on smartcards, are typically intended to be protected from attacks. A type of such attacks is light attacks, typically laser attacks, in which a disruption to the functioning of a component is intended to be effected.

SUMMARY

In various embodiments, a circuit arrangement is provided. The circuit arrangement may include a detection circuit, which is designed to detect light attacks on the circuit arrangement; a processing circuit, which is designed to initiate a current flow through a line for each light attack detected by the detection circuit; and a control circuit, which is designed to enable functioning of a component of the circuit arrangement depending on the conducting state of the line.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

These embodiments are described in detail such that a person skilled in the art can implement the invention. Other embodiments are also possible, and the embodiments can be changed from a structural, logical and electrical perspective without departing from the subject matter of the invention. The various embodiments are not necessarily mutually exclusive, but rather various embodiments can be combined with one another so as to provide new embodiments.

The word "exemplary" is used herein to mean "serving as an example, instance, or illustration". Any embodiment or design described herein as "exemplary" is not necessarily to be construed as preferred or advantageous over other embodiments or designs.

In various embodiments the temporal and spatial repeatability of such fault attacks are restricted.

Registration of light attacks by arrays with nonvolatile memory cells with a dedicated peripheral only enables limited protection from repeated light attacks.

Typically, only small numbers of the attacks are identified by means of a limited number of locally implemented sensor elements, and identification of the attacks with ample area coverage is not possible.

If attacks also take place in quick succession, this is typically not identified and, owing to the required memory programming time, only some of the attacks are registered.

If an attack, owing to its high intensity, produces a latchup in the attacked chip, the ability of the chip to perform functions which can reliably control the execution of the required memory cell programming is no longer provided.

In addition, this approach by means of special memory cell arrays is typically very area-intensive since a separate memory cell array and further components (for example charge pumps etc.) need to be provided.

Various embodiments are described below in which the number of light fault attacks is registered by means of a metal line, in contrast to the above-described approach.

Figure 1:
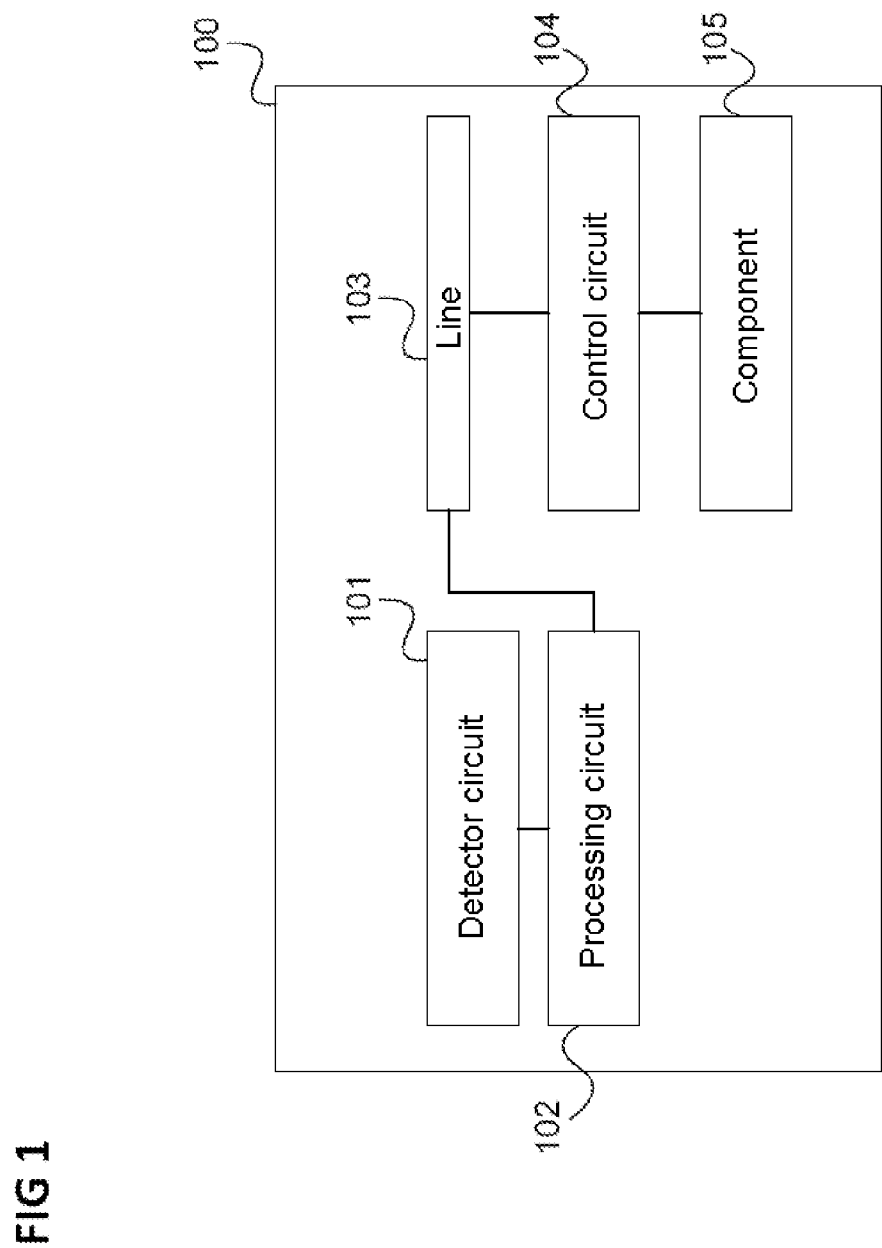
FIG. 1 shows a circuit arrangement in accordance with one embodiment.

FIG. 1 shows a circuit arrangement 100 in accordance with one embodiment.

The circuit arrangement has a detection circuit 101, which is designed to detect light attacks on the circuit arrangement 100 and has a processing circuit 102, which is designed to initiate a current flow through a line 103 for each light attack detected by the detection circuit 101.

In addition, the circuit arrangement has a control circuit 104, which is designed to enable functioning of a component 105 of the circuit arrangement 100, depending on the conducting state of the line 103.

In other words: In accordance with one embodiment, fault attacks (in the form of local light attacks) on a circuit arrangement, for example a chip, are registered by means of a line by virtue of a current flow (of sufficient intensity) through the line being produced, for example, for each detected light attack. The line is configured, for example, in such a way that it ages each time there is a current flow caused in this way such that, after a preset number (for example within a certain number range since the aging typically cannot be precisely predicted) of detected light attacks and corresponding current flows through the line, said line loses its conductivity, for example burns out or fuses (the line is, for example, a thin line, when measured against the current flow initiated, i.e. a line which is not suitable for coping with a current of the magnitude that is produced on a permanent basis). Once the line has burnt out, the control circuit no longer enables functioning of specific components in the circuit arrangement, for example. By way of example, one or more components of the chip, for example a central processing unit, can no longer be started.

In other words: Owing to the initiated current flows through the line, there is integral formation of the detected light attacks, which, in the event that a certain number is overshot (which destroys the line or generally reduces its conductivity by a certain magnitude), results in, for example, permanent blocking of one or more components or the entire chip.

No programming operation is required for this approach, and it can be realized with little complexity and with only a low area requirement (for example no additional memory cell array and further components are required for operation of the additional memory cells).

Since it can be expected that the number of attacks after which the conducting state of the line changes (the line burns out, for example) is dependent on the individual chip, in the case of a plurality of chips, a large degree of scatter can be expected of the number of attacks after which the attacked chip is no longer functional. This makes it more difficult for an attacker to understand the processes in the chip.

The individual attacks are identified, for example, by a well sensor. Burning out (or generally the change in conducting state) of the line sets the chip into a permanent reset state, for example, in which access to the chip is no longer possible.

In accordance with one embodiment, for example, a switch is provided (e.g. connected) in parallel with the line, so that the line can be bypassed. Thus, it is possible for the risk of the line changing its conducting state in an undesired manner and the chip no longer being functional in an undesired manner to be minimized. In other words, the circuit arrangement can be configurable so as to enable functioning of the component of the circuit arrangement independently of the conducting state of the line.

The conducting state is, for example, the conductivity of the line when the line is in the function state, i.e. when the line is not interrupted. The conducting state can also correspond to a lack of conductivity of the line when the line is not in the function state, for example when the line is interrupted.

For example, the control circuit can prevent functioning of the component of the circuit arrangement when the conductivity of the line is below a preset value.

In accordance with one embodiment, the control circuit can set the circuit arrangement to a reset state when the conductivity of the line is below a preset value.

For example, the control circuit can prevent functioning of the component of the circuit arrangement when the line is interrupted.

For example, the control circuit can set the circuit arrangement to a reset state when the line is interrupted.

The control circuit can activate the component, for example, depending on the conducting state of the line.

In one embodiment, the circuit arrangement has a CMOS (complementary metal oxide semiconductor) circuit, and the detection circuit is designed to detect a light attack on the CMOS circuit.

The detection circuit has, for example, a well sensor.

In accordance with one embodiment, the circuit arrangement is a chip.

The control circuit is designed, for example, to start the chip or to leave the chip in a rest state, depending on the conducting state of the line.

In accordance with one embodiment, the line has a line path and a switch connected in parallel with the line path.

In accordance with one embodiment, the detection circuit is designed in such a way that it outputs a signal for each detected light attack on the circuit arrangement, which signal indicates that a light attack has been detected, and the processing circuit is designed to initiate a current flow through a line on reception of the signal.

For example, the processing circuit connects the line at one of its ends to a node with a high supply potential and at its other end to a node with a low supply potential in response to the reception of the signal.

Figure 2:
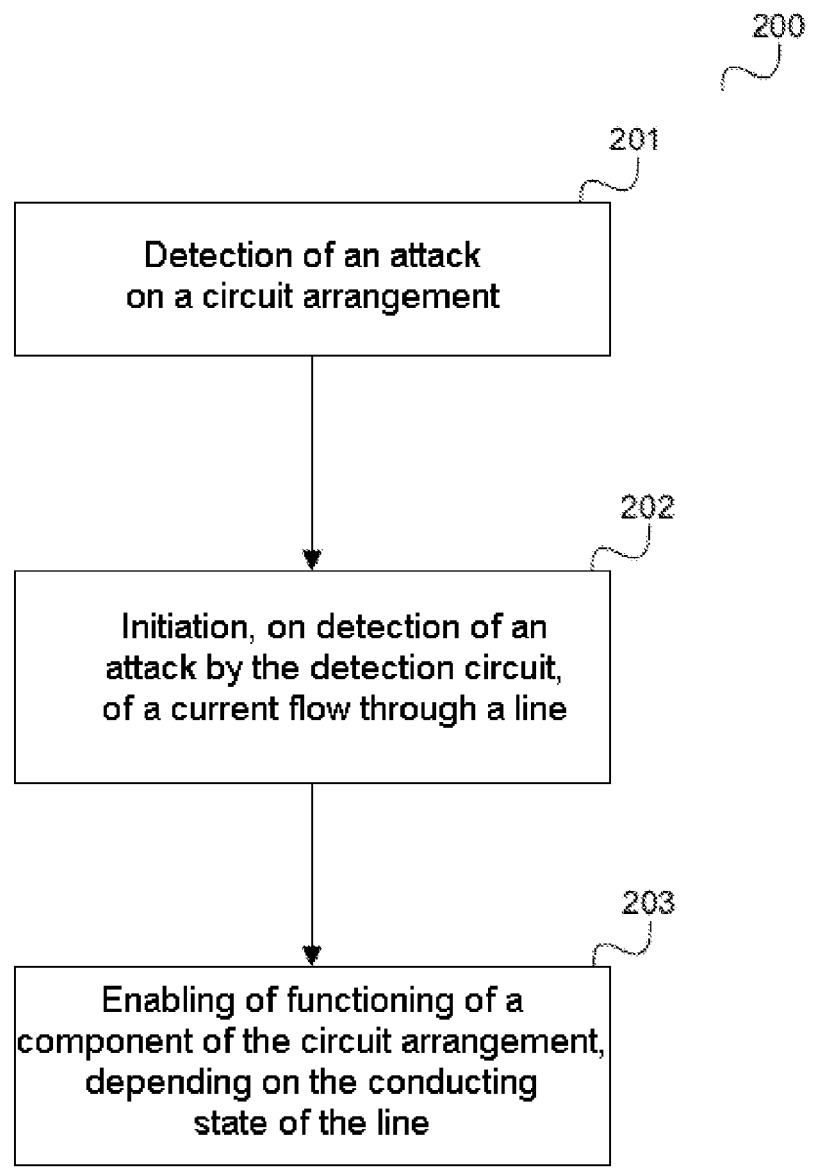
FIG. 2 shows a flow chart in accordance with one embodiment.

The circuit arrangement implements a method, for example, as illustrated in FIG. 2.

FIG. 2 shows a flow chart 200 in accordance with one embodiment.

The flow chart 200 illustrates a method for safeguarding a circuit arrangement with respect to repeated light attacks.

In 201, a light attack on the circuit arrangement is detected.

In 202, a current flow through a line is initiated for each light attack detected by the detection circuit.

In 203, the functioning of a component of the circuit arrangement is enabled depending on the conducting state of the line.

It should be noted that 203 does not necessarily need to be implemented after 202, but is implemented permanently, for example, when the circuit arrangement is switched on, each time the circuit arrangement is started or periodically, and 202 is implemented depending on the occurrence of a light attack.

Exemplary embodiments which are described in connection with the circuit arrangement 100 apply similarly to the method illustrated in FIG. 2, and vice versa.

Exemplary embodiments will be described in more detail below.

In accordance with one embodiment, the detection circuit is based on the detection of a change in voltage in a well. An example of a corresponding detection circuit is described below with reference to FIG. 3.

Figure 3:
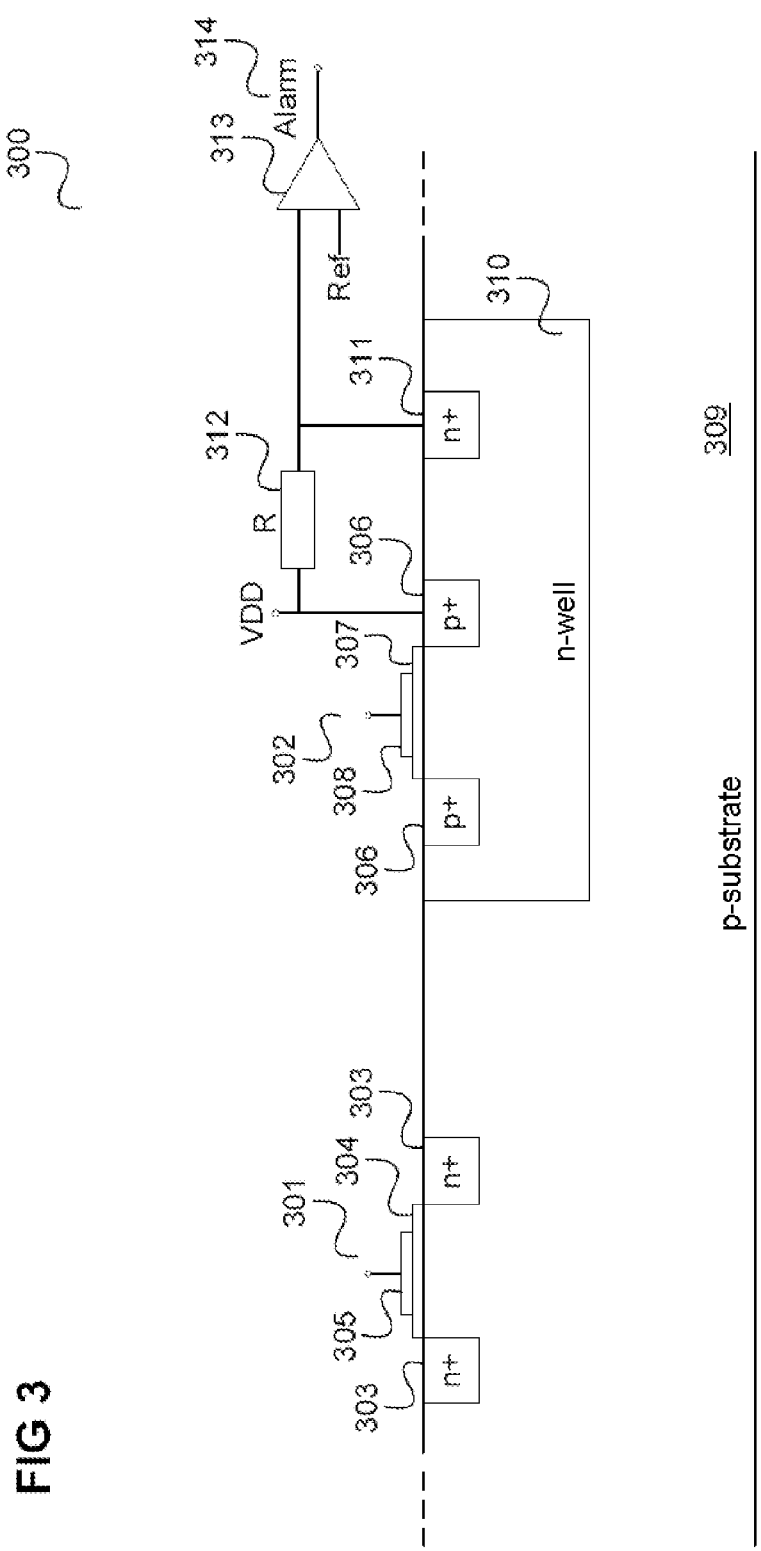
FIG. 3 shows a detection arrangement in accordance with one embodiment.

FIG. 3 shows a detection arrangement 300 in accordance with one embodiment.

In this example, the detection arrangement is part of a chip using CMOS technology. Correspondingly, the chip has a multiplicity of nMOS transistors and a multiplicity of pMOS transistors. An nMOS transistor 301 and a pMOS transistor 302 are illustrated by way of example for these transistors.

The nMOS transistor 301 has two n-doped regions 303, an insulation layer 304 and a gate region 305.

Similarly, the pMOS transistor 302 has two p-doped regions 306, an insulation layer 307 and a gate region 308.

The nMOS transistor 301 is arranged in a p substrate 309. The pMOS transistor 302 is arranged in an n-well 310, which is located in the p-substrate 309. The n-well 310 has a well connection region 311. The well connection region 311 is connected to the high supply potential (VDD) by a resistor 312. One of the p-doped regions 306, which acts as source region of the pMOS transistor 302, is likewise connected to the high supply potential.

The well connection region 311 is also connected to an input of a comparator 313, whose other input is connected to a reference potential (lower than VDD).

Since the well connection region 311 is connected to the high supply potential via the resistor 312 at a high resistance, discharge of the n-well 310 owing to an attack has the effect that the potential of the n-well 310 in comparison with VDD decreases for a certain period of time. If the potential to which the n-well 310 decreases is lower than the reference potential, this is detected correspondingly by the comparator and an alarm signal 314 is output by the comparator.

By virtue of suitable selection of the reference potential, a light attack which results in discharge of the n-well 310 can thus be detected.

Typically, in the case of a chip using CMOS technology, a multiplicity of transistors are arranged in a well. In other words, the n-well 310 is connected to many further n-wells, which together cover a large chip area. Thus, light attacks (for example laser attacks) can be detected with ample area coverage independently of the typically locally extremely limited occurrence of an attack (for example on an area of 2 μm×2 μm).

Light attacks with a relatively low and average amplitude on the chip can be detected via the decrease in the well potential. The detection circuit (i.e. the arrangement including the well connection region 311, the resistor 312 and the comparator 313) identifies the light attack on the basis of the reduced well potential.

In the event of a light attack with a (sufficiently) large amplitude which discharges the n-well 310, the chip ultimately transfers to a latchup state (permanent conduction of the two parasitic bipolar transistors which are formed by n-doped region 303, p-substrate 309 and n-well 310 or p-doped region 306, n-well 310 and p-substrate 309).

An example of a processing circuit and a control circuit which receive the alarm signal 314 as input signal, for example, is described below with reference to FIG. 4.

Figure 4:
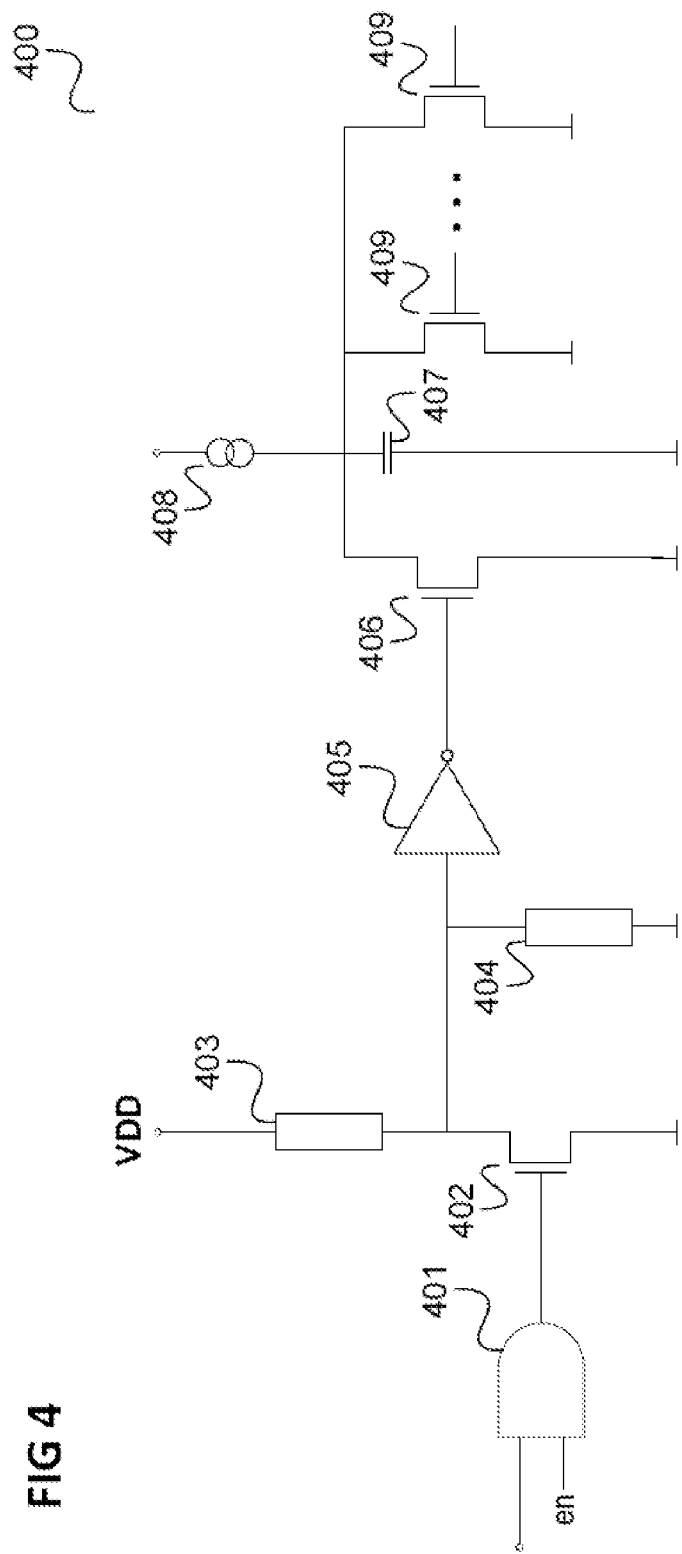
FIG. 4 shows a circuit arrangement in accordance with one embodiment.

FIG. 4 shows a circuit arrangement 400 in accordance with one embodiment.

The circuit arrangement 400 has an AND gate 401, which receives a signal via its first input, which signal (with a logic 1) indicates that an attack has been detected, for example the alarm signal 314. The second input of the AND gate 401 is connected to an activation (enable) input, by which the further-processing of the detection signal can be activated, which is assumed below.

The output of the AND gate 401 is coupled to a first nMOS transistor 402, whose source connection is connected to the low supply potential (VSS) and whose drain connection is connected to an end of a metal line 403, whose other end is connected to the internal supply potential VDD or to an external supply potential VDDP provided by a chip-external voltage source. The metal line 403 is, for example, a thin metal resistor, which is configured in such a way that every time the detection signal indicates an attack and, correspondingly, the first nMOS transistor 402 is switched on, a high current (of a few 100 mA, for example) flows through the line 403, so that the line 403 is interrupted after a certain number of attacks (for example several hundred or thousand) owing to the currents caused (i.e. said line burns out).

In other words, the time integral of all of the attacks results in interruption of the line.

The circuit including the AND gate 401 and the nMOS transistor 402 can be considered to be an example of the processing circuit 102.

The drain connection of the first nMOS transistor 402 is additionally connected, via a resistor 404 at a high resistance, to the low supply potential and to the input of an inverter 405, whose output is connected to the gate connection of a second nMOS transistor 406.

The source connection of the second nMOS transistor 406 is connected to the low supply potential, and its drain connection is connected to the connection node between a capacitor 407 and a current source 408. The series circuit including the current source 408 and the capacitor 407 models a starting circuit of the circuit arrangement 400, for example a chip. During normal starting (i.e. with the line 403 intact), the nMOS transistor 406 turns off and the current source charges the capacitor 407. If the capacitor 407 has been charged sufficiently, the connection node between the capacitor 407 and the current source 408 is at a high potential, which is interpreted as a switch-on signal (power-ok signal) for the chip, and further components of the chip (not shown) are started or functioning thereof is enabled by means of switches 409.

If, on the other hand, the line 403 is interrupted, the second nMOS transistor 406 is conducting, and the charging of the capacitor 407 is prevented, as a result of which a switch-on signal is never output to the further components. Switching on of the further components is thus prevented.

In other words, this results in a permanent POR (power on reset) state with the result that the chip never starts again.

The circuit arrangement also has reset paths, with which the chip can be set to the POR state.

Instead of the line 403 burning out, a decrease in the conducting state by a specific percentage value (for example 10%) can also be detected and, in the event of a detection of such a decrease, the functioning of the components of the circuit arrangement (for example of the chip) can be blocked (i.e. can no longer be enabled). In this case, a comparator can be provided instead of the inverter 405, which comparator compares the potential at the connection node between the line 403 and the resistor 404 with a reference potential and turns off the second nMOS transistor 406 when the potential at the connection node between the line 403 and the resistor 404 is above the reference potential, and turns on the second nMOS transistor 406 when the potential at the connection node between the line 403 and the resistor 404 is below the reference potential.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
    a detection circuit, which is designed to detect light attacks on the circuit arrangement;
    a processing circuit, which is designed to initiate a current flow through a line for each light attack detected by the detection circuit; and
    a control circuit, which is designed to enable functioning of a component of the circuit arrangement depending on the conducting state of the line.
2. The circuit arrangement of claim 1,
    wherein the conducting state in the function state of the line is the conductivity of the line.
3. The circuit arrangement of claim 2,
    wherein the control circuit is designed to prevent the functioning of the component of the circuit arrangement when the conductivity of the line is below a preset value.
4. The circuit arrangement of claim 2,
    wherein the control circuit is designed to set the circuit arrangement to a reset state when the conductivity of the line is below a preset value.
5. The circuit arrangement of claim 4,
    wherein the control circuit is designed to prevent functioning of the component of the circuit arrangement when the line is interrupted.
6. The circuit arrangement of claim 4,
    wherein the control circuit is designed to set the circuit arrangement to a reset state when the line is interrupted.

7. The circuit arrangement of claim 1,
wherein the control circuit is designed to activate the component depending on the conducting state of the line.

8. The circuit arrangement of claim 1, wherein the circuit arrangement has a CMOS circuit, and the detection circuit is designed to detect a light attack on the CMOS circuit.

9. The circuit arrangement of claim 8, wherein the detection circuit has a well sensor.

10. The circuit arrangement of claim 1, wherein the circuit arrangement is a chip.

11. The circuit arrangement of claim 10,
wherein the control circuit is designed to start the chip or to leave the chip in a reset state, depending on the conducting state of the line.

12. The circuit arrangement of claim 1,
wherein the line has a line path and a switch connected in parallel with the line path.

13. The circuit arrangement of claim 1,
wherein the detection circuit is designed in such a way that it outputs a signal for each detected light attack on the circuit arrangement, which signal indicates that a light attack has been detected; and
wherein the processing circuit initiates a current flow through the said line on reception of the signal.

14. The circuit arrangement of claim 13,
wherein, in response to the reception of the signal, the processing circuit is configured to connect the line at one of its ends to a node with a high supply potential and at its other end to a node with a low supply potential.

15. A method for safeguarding a circuit arrangement with respect to repeated light attacks, the method comprising
detecting a light attack on the circuit arrangement;
initiating, for each light attack detected by the detection circuit, a current flow through a line; and
enabling functioning of a component of the circuit arrangement, depending on the conducting state of the line.

* * * * *